United States Patent [19]

Reinsch et al.

[11] Patent Number: 5,421,635
[45] Date of Patent: Jun. 6, 1995

[54] VEHICLE ROOF WITH A SERIES OF PLATES

[75] Inventors: Burkhard Reinsch, Neuried; Peter Reihl, Starnberg; Thomas Schreiter, Munich; Hans Jardin, Inning, all of Germany

[73] Assignee: Webasto Karosseriesysteme GmbH, Stockdorf, Germany

[21] Appl. No.: 132,183

[22] Filed: Oct. 6, 1993

[30] Foreign Application Priority Data

Oct. 6, 1992 [DE] Germany ............... 42 33 507.8

[51] Int. Cl.⁶ .......................................... B60J 7/047
[52] U.S. Cl. ................................ 296/220; 296/223
[58] Field of Search .............. 296/216, 219, 220, 222, 296/223

[56] References Cited

U.S. PATENT DOCUMENTS

| | | | |
|---|---|---|---|
| 1,839,727 | 1/1932 | Austin | 296/219 |
| 2,263,216 | 11/1941 | Latchford | 296/220 |
| 2,348,579 | 5/1944 | Solis | 296/220 X |
| 3,713,689 | 1/1973 | Podolan et al. | 296/220 |
| 3,720,440 | 3/1973 | Podolan | 296/220 |
| 3,904,239 | 9/1975 | Jardin | 296/91 X |
| 3,994,525 | 11/1976 | Breitschwerdt et al. | 296/220 |
| 4,934,098 | 6/1990 | Prouteau | 296/222 X |
| 5,052,746 | 10/1991 | Reihl et al. | 296/217 |

FOREIGN PATENT DOCUMENTS

| | | | |
|---|---|---|---|
| 0101322 | 2/1984 | European Pat. Off. | 296/222 |
| 1512575 | 12/1966 | France . | |
| 1811690 | 9/1959 | Germany . | |
| 2403739 | 7/1975 | Germany | 296/220 |
| 3426998 | 1/1986 | Germany . | |
| 3532150 | 10/1986 | Germany . | |
| 4123229 | 1/1993 | Germany . | |
| 573355 | 11/1945 | United Kingdom . | |
| 2257669 | 1/1993 | United Kingdom | 296/219 |

Primary Examiner—Dennis H. Pedder
Attorney, Agent, or Firm—Sixbey, Friedman, Leedom & Ferguson; David S. Safran

[57] ABSTRACT

Vehicle roof with a series of plates for selectively closing and at least partially opening a roof opening in a fixed roof surface. The plates abut one another in the closed position and form a flat interlocking system of plates within which each plate is guided on each side on two guide points, that are spaced from each other in a sliding direction, along a guiding device that is connected with the fixed roof surface so that, when the plates are displaced, the flat interlocking system of plates performs a translatory movement during which the interlocking system is separated in a plate-by-plate manner when the roof is opened and is reestablished when the roof is closed. At least the forward guide points of the plates interact with the same guideway, and both guide points of the plates are maintained in engagement with the guiding devices over their entire path of displacement. The guiding devices are constructed and arranged with respect to the fixed roof surface so that the plates, when the roof is opened, dip under the fixed roof part at a rear end of the roof opening.

18 Claims, 6 Drawing Sheets

VEHICLE ROOF WITH A SERIES OF PLATES

BACKGROUND OF THE INVENTION

The invention relates to a vehicle roof with a series of plates for alternatively closing or at least partially opening a roof opening in a solid roof surface, and in which the plates, in the closed position, abut one another and form a flat interlocking system of plates, within which each plate is guided on both sides, on two guide points lying at a distance from one another in the sliding direction, along guiding devices integral with the roof such that, when shifting the plates, the flat interlocking system of plates performs a translation movement during which the interlocking system is released at its rear end, plate by plate, when the roof is opened, or is reestablished when the roof is closed, and at least the forward guide points of the plates interact with a guideway allocated jointly to the plates.

DESCRIPTION OF RELATED ART

In a known vehicle roof of the above-mentioned type (German Utility Model 1 811 690), both guide points of each plate consist of pins that each project laterally from a side guide wall attached to the underside of the respective plate. The pins lie at different heights and engage in guideways, that run parallel to each other at a distance from one another, of a guide rail that is fixed with the roof. When opening the roof, the pins lying, in each case, in front in the opening direction, leave the associated guideway one after the other, while simultaneously the respective plate is caused to make a pivoting movement, in a way not disclosed in more detail, around the other pin that remains in its guideway. In the known vehicle roof, the stability especially leaves much to be desired when the roof is at least partially open.

A vehicle roof with plates is further known (German Patent 35 32 150 C1) in which, to open the previously closed roof, the plates are first pivoted together by a spindle drive into an upwardly pushed-out position and are then pushed rearward. With this roof, as a result, the flat interlocking system of plates, as a whole, immediately is released when the roof is to be opened. This is disadvantageous aerodynamically. Even at relatively low traveling speed, disturbing wind noises can appear.

In another known vehicle roof (British Patent 573,355), a series of plates is provided to which lengthwise guideways, each lying at a different height, are associated, along each of which a respective one of the plates is guided to be roof, the plates can be brought to different height positions and then pushed together. A swinging out of the plates is not provided for, so that at least able to slide by articulated parallelograms. To open the previously closed a part of the roof opening that corresponds to the width of a plate remains closed as a result.

In another known vehicle roof with plates (French Patent 1 512 575), each of the plates is guided on both sides in its own guideway. The guideways vary in length corresponding to the slide path of the individual plates; they lie above one another and rise, ramp-like, from the rear to the front. The plates are connected to one another by a scissor linkage so that, when shifted, they simultaneously change their position relative to the adjacent plate in each case.

A vehicle roof of the above-mentioned type, in which, to increase stability and securely hold the plates, both guide points of the plates are engaged in the guiding devices throughout the entire range of displacement of the plates, is described in commonly owned U.S. patent application Ser. No. 07/940,217, now U.S. Pat. No. 5,335,961.

SUMMARY OF THE INVENTION

The primary object of the invention is to make a vehicle roof that possesses high stability and secure holding of the plates in all roof positions, and that has an aerodynamically favorable behavior even at relatively high travel speeds, without having to forego opening of a considerable part of the roof opening.

A further object is to obtain a vehicle roof which is able to be configured aesthetically, especially attractively, without compromising the noted primary object.

In a vehicle roof with preferred embodiments of the invention, this object is achieved by both guide points of the plates being engaged in the guiding devices integral with the roof throughout the entire range of plate movement, and by arranging the guiding devices that are fixed with the roof so that, the panels move under the fixed roof surface when opening the roof.

With this design, a particularly stable holding of the plates in all operational positions of the roof is guaranteed. Also, when the roof is partially or fully opened, the slidable plates do not project above the profile line of the roof. This is especially advantageous considering aerodynamic behavior and the outer appearance of the vehicle.

Suitably, the guiding devices that are fixed with the roof are configured so the plates, when the roof is open, lie in planes at least approximately parallel to one another. The movement mechanism can be kept especially simple when the arrangement is made so the rearmost plate, in the closed roof position, is at the very bottom and the foremost plate, in the closed roof position, is at the very top.

Preferably, when the roof is open, the plates are mutually offset, overlapping one another in the direction of travel, such that the rearmost plate in the closed roof position lies farthest to the rear and the foremost plate in the closed roof position lies farthest to the front. Such a design ensures that, when the roof is open, the plates assume positions in which they disturb the use of the vehicle interior very minimally.

The adjustment mechanism can be designed so that at least some of the plates can be automatically coupled with a roof drive as a function of the plate position or automatically decoupled from the roof drive, as explained in detail in the noted co-pending U.S. patent application Ser. No. 07/940,217, now U.S. Pat. No. 5,335,961. In such a case, the plates can be stacked into a packet of relatively low height when the roof is open.

In contrast, the adjustment mechanism can be kept especially simple when it is ensured that the plates are constantly connected to the adjustment mechanism (the roof drive). To avoid a disruptive detraction from the vehicle interior when the roof is open, also in such a case, preferably the plates are arranged, when the roof is open, separated mutually by height like Venetian blinds in front of the rear window. Here, there can be provided, in front of the rear window, a transparent partition that delimits, together with the rear window, a space within which the plates are located when the roof is open.

Also the rear guide points, at least of the plates lying in front of the rearmost plate when the roof is closed, can interact with a guideway allocated to these plates jointly. The forward guide points of the plates and the associated guiding devices integral with the roof suitably lie lower than the rear guide points of the plates and the guiding devices integral with the roof allocated to them.

Preferably, at least the rearmost plate is mounted to pivot around its forward guide point to release and reestablish the flat interlocking system of plates. Here, the arrangement is advantageously made so that, when the roof is opened, first the rearmost plate, starting at a point that is at least approximately flush with the fixed roof surface adjacent to the rear, can be pivoted with its rear area under the level of the fixed roof surface, and then, the interlocking system of plates and the rearmost plate can be slid rearward. When the roof is further opened, suitably the remaining flat interlocking system of plates, respectively, can be slid first rearward into an intermediate position without gaps in which the last plate in each case of the interlocking system lies at least approximately flush with the fixed roof surface adjacent to the rear and, before a further rearward sliding of the remaining flat interlocking system of plates, the last plate in each case can first be pivoted with its rear area under the level of the fixed roof surface. In this way, the flat interlocking system of plates can be brought into intermediate positions in which a gap in the area of the rear edge of the roof opening is avoided. With the use of a manual roof drive, these intermediate positions without gaps can be controlled by a catch. If a motorized roof drive is provided, the intermediate positions without gaps can suitably be reached by a preselect controller.

A sealing arrangement, preferably equipped with an expandable sealing bellows, can be provided, in the area of the rear edge of the roof opening, to seal the gap between the fixed roof surface and the top side of the plates, when the roof is open and in intermediate positions between the closed and open positions. These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENT

Figure 1:
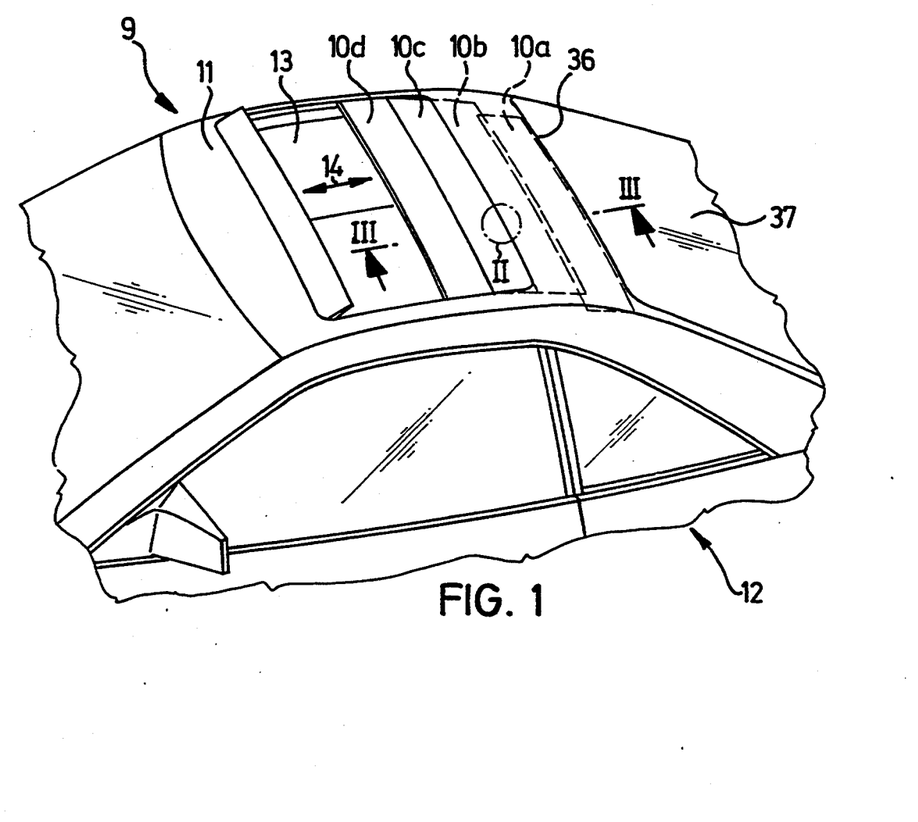
FIG. 1 is a diagrammatic perspective view of a vehicle roof in a half-open position.

With reference to FIGS. 1 to 6, vehicle roof 9, to be called a plate roof, has a series of sliding plates 10a to 10d. These plates are used for alternatively closing or at least partially opening a roof opening 13 made in a fixed roof surface 11 of a motor vehicle 12. To open and close the roof 9, the plates 10a to 10d can be slid parallel to the lengthwise axis of the vehicle, as indicated in FIG. 1 by double arrow 14. In its final forward position, that determines the closed position, plates 10a to 10d abut one another tightly along their lengthwise edges which run crosswise to sliding direction 14. In this condition, a flat interlocking system of plates is formed, as indicated in FIG. 1 for forward plates 10c and 10d. (The terms "forward" and "rear" used here refer to the normal travel direction of vehicle 12.)

An existing movement mechanism, that can be constructed in the way described in the above-noted U.S. patent application Ser. No. 07/940,217 (U.S. Pat. No. 5,335,961), coordinates the adjustment movements of individual plates 10a to 10d such that when displacing the sliding plates, the flat interlocking system of plates performs a translation movement in sliding direction 14, during which the interlocking system is released plate by plate, at its rear end, when the roof is opened or is reestablished when the roof is closed. Thus, the movement mechanism will not be described herein in detail and recourse can be had to said application Ser. No. 07/940,217, which is hereby incorporated by reference.

Figure 4:
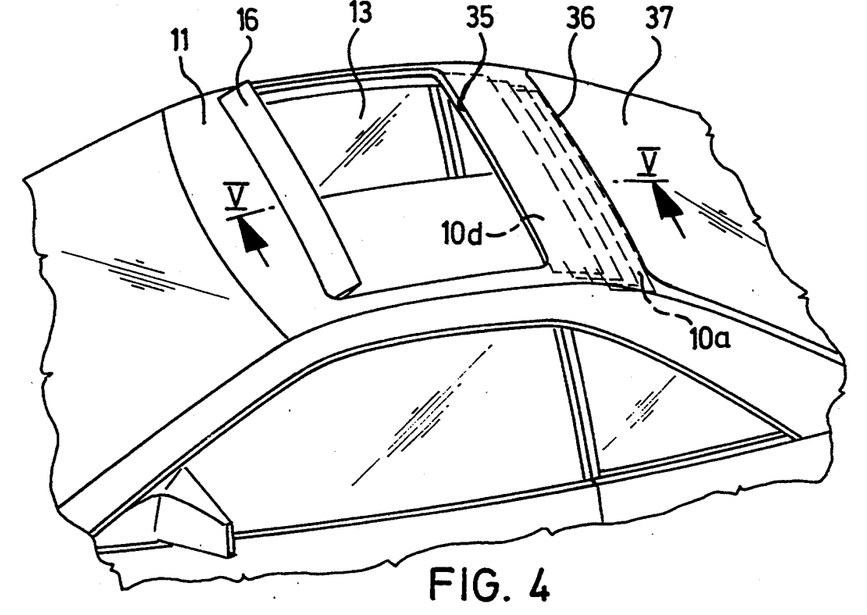
FIG. 4 is a perspective view corresponding to FIG. 1, but of the roof in its fully open state.

When opening previously closed roof 9, first only rearmost plate 10a is pivoted so it is released, with its rear edge, from the rear edge of roof opening 13. Plate 10a can then be pushed back, beginning in this tilted position, together with the rest of the plates 10b to 10d that remain in the interlocking system of plates, i.e., are not pivoted out, and plate 10a dips under the fixed roof part adjacent to roof opening 13 to the rear. While rearmost plate 10a moves in the direction of its rear final position, indicated in FIG. 1, the next plate 10b is released in a corresponding way from the interlocking system of plates, and also dips to the rear under fixed roof surface 11. As soon as each plate has reached its rear final position, it is decoupled from the roof drive. This procedure is repeated plate by plate until finally the state illustrated in FIG. 4 is reached in which all of the plates 10a to 10d are stacked into a packet of relatively low height under the rear part of the fixed roof surface. Roof opening 13 is completely opened. When roof 9 is to be closed, the plates are again coupled one after the other with the roof drive. Here, starting from the open position according to FIG. 4, first only plate 10d is moved forward and pivoted back into a position parallel to fixed roof surface 11. A corresponding course of movement is then forced on following plates 10c to 10a one after the other, until the plates are in a flat, interlocking system in their forward final position and close roof opening 13.

In the illustrated embodiment of vehicle roof 9, in the area of the forward end of roof opening 13, there is a plate-shaped wind deflector 16 that can be pushed out and that is pivoted, when the opening procedure is begun, around a real or virtual axis of rotation running crosswise to the lengthwise axis of the vehicle, into a tilted position rising toward the rear. In the closed position of roof 9, wind deflector 16 comes to lie tightly with its rear edge against the forward edge of sliding plate 10d, which is in its forward final position. The wind deflector thus closes the foremost part of roof opening 13. But, optionally, the design can also be made so the flat interlocking system of plates 10a to 10d, in the closed position, reaches from the forward edge to the rear edge of roof opening 13 and thus alone assumes the closing function. Here, optionally, in a way known in the art for sliding roofs (German Offenlegungsschrift 34 26 998 and U.S. Pat. Nos. 5,052,746 and 3,904,239), a wind deflector can be provided which, when the roof is closed, disappears under the fixed roof surface and automatically transitions into a working position when the roof is opened.

In FIGS. 1 and 4, a vehicle roof with four sliding plates 10a to 10d is represented. But of course, any number of sliding plates can basically be selected as a function of the respective conditions, for example, the length of roof opening 13.

Figure 5:
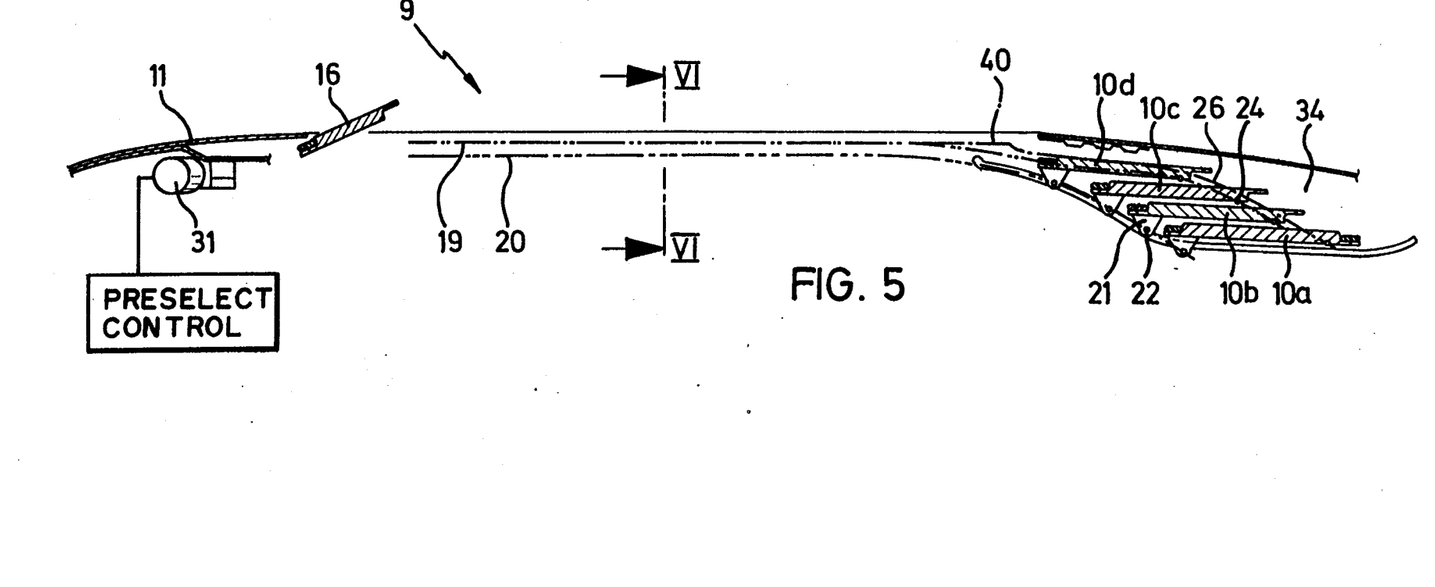
FIG. 5 is a sectional view taken along fine V—V in FIG. 4.
Figure 6:
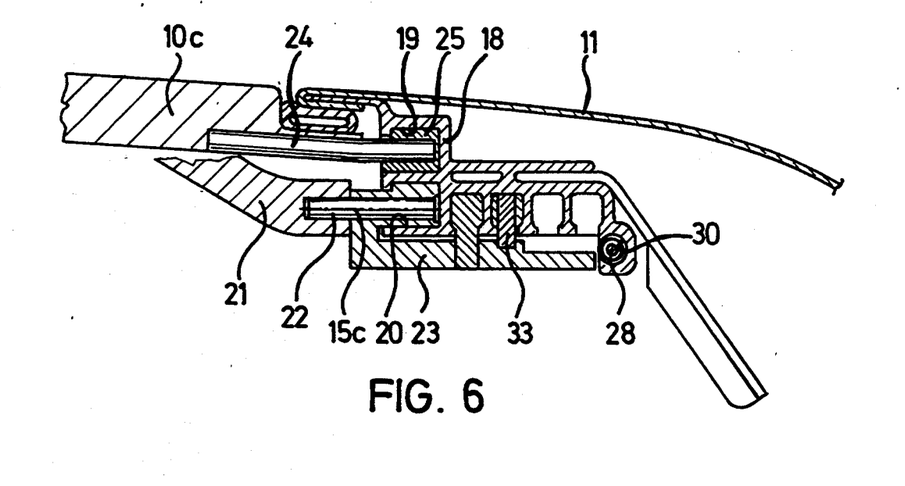
FIG. 6 is an enlarged view taken along line VI—VI in FIG. 5.

As can be seen in detail in FIG. 6, vehicle roof 9 has guide rails 18 that extend on each side of roof opening 13 and rearwardly passed the opening to under the rearwardly adjacent part of fixed roof surface 11. On both sides of roof 9, the construction is essentially in mirror-image symmetry relative to a lengthwise center line, so that the representations and explanations for one side of the roof also apply to the laterally opposite roof side. Guide rail 18 has an upper guideway 19 and a lower guideway 20. Both guideways 19 and 20 run in the lengthwise direction of the vehicle, and they extend, in the area of the side edges of roof opening 13, at least approximately parallel to one another, as is apparent from FIG. 5.

On both sides of plates 10a to 10d, there is attached, in front, a downward-projecting connecting rod 21, from which a link pin 22 protrudes laterally outward. Each of link pins 22 engages in a respective forward guide bearing 23. Forward guide beatings 23 of plates 10a to 10d are guided to slide along lower guideway 20 of guide rail 18. Link pins 22, oriented crosswise to sliding direction 14, determine axes of rotation 15a to 15d of plates 10a to 10d.

Figure 3:
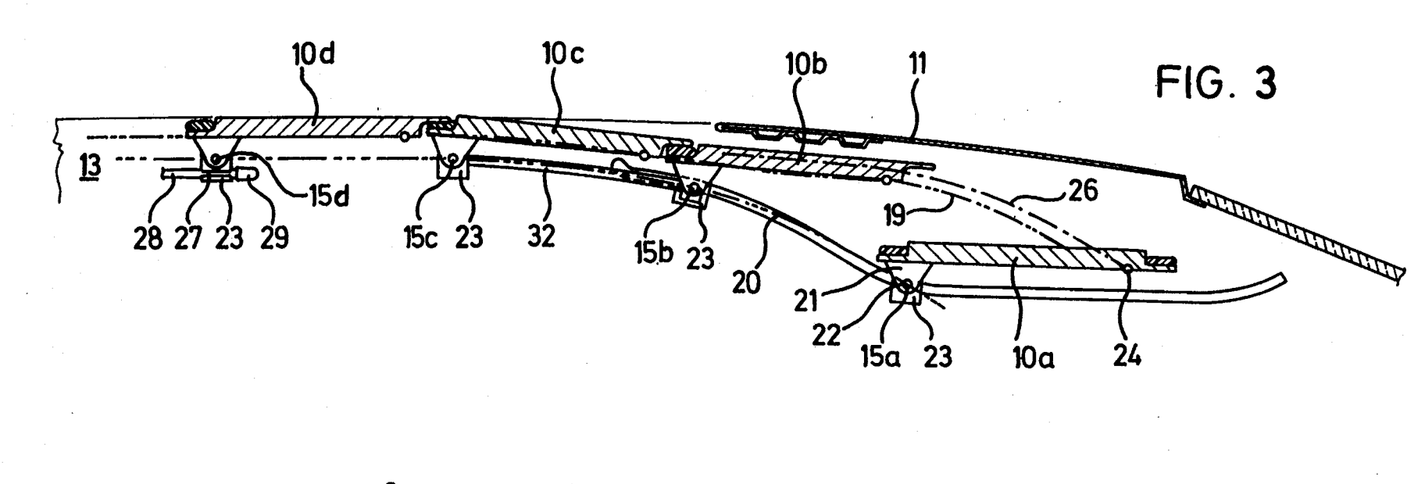
FIG. 3 is a section taken along line III—III of FIG. 1.

A guide bolt 24 projects, in the rear area, on both sides of each of the plates 10a to 10d. Guide bolts 24 of plates 10a to 10d are guided to slide by rear guide beatings 25 along upper guideway 19 of guide rail 18. Guide bolts 24 of the rearmost plate 10a interact, by respective rear guide beatings 25, with an additional guideway 26 of guide rail 18 instead of guideway 19 at each side of the roof opening. Each guideway 26 runs, as shown in FIGS. 3 and 5, at an essentially constant distance, above the rear part of the corresponding upper guideway 19. Guide bolts 24 of all of the plates 10a to 10d also allow a pivoting movement of the associated plates with respect to guide rail 18 around an axis determined by the respective guide bolt 24 and running crosswise to sliding direction 14.

In the embodiment illustrated, the forward guide points of the plates, formed by link pins 22, lie lower than the rear guide points, formed by guide bolts 24 of the plates, and the forward guide points are offset to the rear by a predetermined distance from the forward edge of the plates, while the rear guide points are offset forward by a predetermined distance from the rear edge of the plates.

Forward guide bearing 23 of foremost sliding plate 10d has a lengthwise opening 27, through which one end of a drive cable 28 is placed. An end cap 29 is placed on the end of drive cable 28 projecting rearward by guide beating 23. Drive cable 28 and forward guide bearing 23 of the forwardmost plate 10d are slaved in this way to one another in the sliding direction of the plates. At each side of the roof, drive cable 28 is guided to slide, at least in the area of the side edge of roof opening 13, in a cable guide channel 30 of guide rail 18 (FIG. 6). Drive cable 28 is preferably made as a threaded cable, and extends, by cable guide channel 30, and optionally a guide robe connected to it, to a drive unit 31 which is located, in the embodiment according to FIG. 5, in front of roof opening 13 under fixed roof surface 11.

Drive unit 31 can, in a way known for sliding roofs, have an electric motor and a reduction gear. Here, a pinion connected to the output of the reduction gear can be engaged with drive cable 28 and a corresponding drive cable for the other roof side. Of course, instead of a motorized drive, a manual drive, e.g. by a hand lever, can also be provided.

Forward guide beatings 23 of plates 10a to 10d are mutually connected, detachably, by flexible connecting rods 32, only one of which is represented in FIG. 3. This connection is established, for example, by locking bolts 33, one of which can be seen in FIG. 6. The design is made so that, when roof 9 is closed, forward guide bearings 23 are positively connected to one another by connecting rods 32 and the associated locking bolt couplings and so that, when the roof is opened, the couplings automatically disengage, starting with plate pair 10a, 10b located in the front in the opening direction or, when the roof is closed, these couplings automatically engage, starting with plate pair 10c, 10d lying in front in the closing direction. To disengage the couplings, stops integral with the roof, not illustrated, can be provided, against which connecting rods 32 impact, one after the other, when the roof is opened. The locking bolt-shifting couplings and their interaction with connecting rods 32 can, for example, be designed or made as it is described in detail in German patent application P 41 23 229.1. But basically, the coupling of the plates to the common drive (drive cable 28) and the decoupling of the plates, if necessary, from this drive can be done in any other way, for example, by electromagnetically shiftable couplings, so that the details thereof, themselves, form no part of the present invention.

As can be seen in FIGS. 1 and 3 to 5, in the embodiment according to FIGS. 1 to 6, the design is made so that, when the roof is open, the plate 10a, which is rearmost in the closed roof position, is at the very bottom and the plate 10d, which is frontmost in the closed roof position, is at the very top. Here, when the roof is open, plates 10a to 10d, overlap one another and are mutually offset in the travel direction so that the rearmost/bottom plate 10a lies the farthest to the rear and the foremost/top plate 10d lies farthest forward. Plates 10a to 10d are stacked, when the roof is open, into a packet of relatively low height, in a space 34 located between the rear edge 35 of roof opening 13 and the top edge 36 of rear window 37 (FIG. 4).

Figure 2:
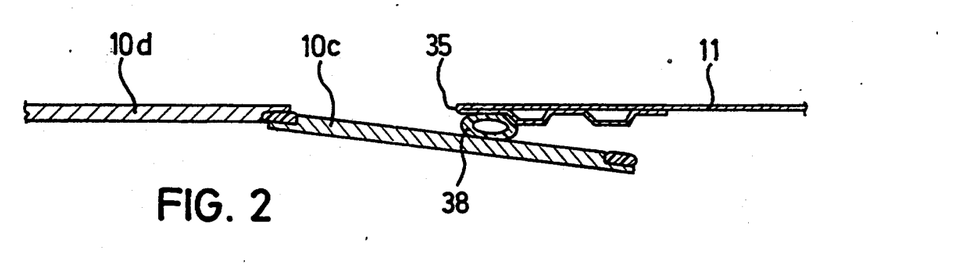
FIG. 2 is an enlarged view in partial section in the area the encircled detail II in FIG. 1.

Referring to FIG. 2, in the area of rear edge 35 of roof opening 13, a bellows seal 38 can be provided that seals the gap between the underside of fixed roof surface 11 and plates 10a to 10d located in this area in all intermediate positions of the roof and when it is fully open. Thus, air is prevented from flowing through this gap in an undesired way. Bellows seal 38 can, optionally, be able to be operated mechanically, pneumatically or hydraulically, to obtain the desired sealing effect. Instead of an alternatively expandable sealing bellows, a sealing lip or the like, attached to the underside of fixed roof surface 11, can also be provided.

Figure 7:
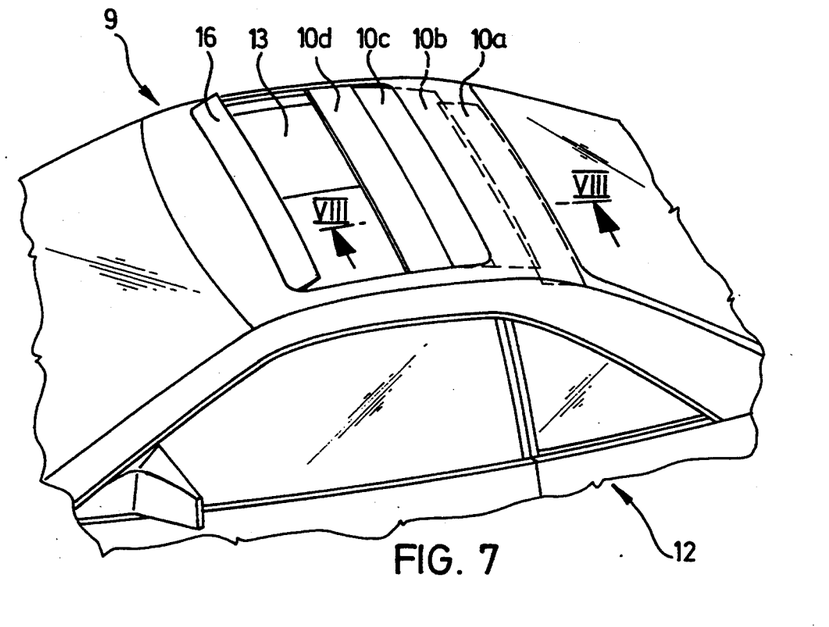
FIG. 7 is a diagrammatic perspective view similar to FIG. 1 of a modified embodiment of the roof.
Figure 8:
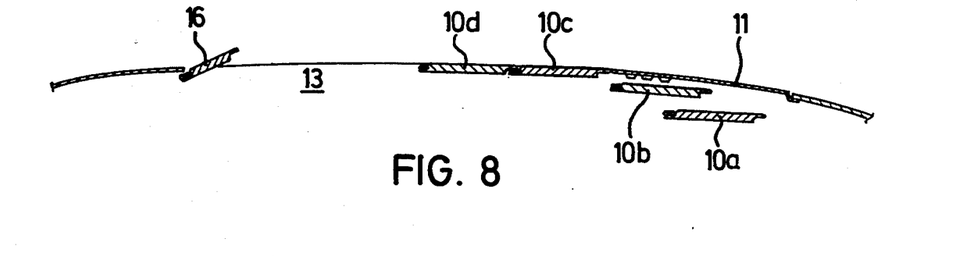
FIG. 8 is a diagrammatic section view taken along line VIII—VIII in FIG. 7.

Instead of upper guideway 19 for plates 10b to 10d and additional guideway 26 for rearmost plate 10a, a guideway 40, allocated jointly to all plates 10a to 10d (illustrated in FIG. 5 in dashed lines) can be provided instead. When a roof configured this way is opened, first rearmost plate 10a, starting at a point that is at least approximately flush with the fixed roof surface adjacent to the rear, is pivoted in its rear area under the level of fixed roof surface 11. Then, the interlocking system of plates (plates 10b to 10d) and rearmost plate 10a are pushed rearward. When the roof is further opened, the remaining flat interlocking system of plates can respectively be pushed first rearward into an intermediate position without gaps, in which the last plate in each case of the interlocking system lies at least approximately flush with the fixed roof surface adjacent to the rear, as illustrated in FIGS. 7 and 8. In this intermediate position without gaps, the sealing function is thus retained. Before a further rearward pushing of the rest of the flat interlocking system of plates, the last plate in each case is first pivoted, at its rear area, under the level of fixed roof surface 31.

In the design of the roof according to FIGS. 7 and 8, using alternative guideway 40 according to FIG. 5, suitable means are provided that equip the driver to purposely control the intermediate positions without gaps. With a manual roof drive, this can suitably be performed by a catch (not illustrated in more detail). With the use of a motorized roof drive, a preselect control C can be provided, by which the intermediate positions without gaps can be reached selectively.

In FIGS. 9 to 12, another embodiment of vehicle roof 9 is illustrated, in which five sliding plates 10a to 10e, in this case, in the area of both their guide points formed by link pins 22 and guide bolts 24, are guided to slide along guideways 42 and 43. These guideways 42 and 43 extend not only along the sides of roof opening 13 and under the area of fixed roof surface 11 adjacent to it to the rear, but they continue in an area located on each side of the rear window 37. In contrast to the embodiments explained above, forward guide bearings 23 of all plates 10a to 10e are integrally connected, to be driven by drive cable 28. That is, all of the plates remain coupled to drive cable 28, independently of the respective roof position, over the entire range of movement between the closed position of the roof and the open position of the roof. From the part of guideway 43 located near rear edge 35 of roof opening 13, a guideway section 44 branches off for guide bolts 24, a section with which guide bolt 24 of only rearmost plate 10a interacts at the beginning of the roof opening procedure and at the end of the roof closing procedure.

When the roof is opened, guideway section 44 causes a pivoting of plate 10a around axis of rotation 15a, determined by link pin 22, such that the rear area of this plate is pivoted out of a position at least approximately flush with the fixed roof surface to under the level of the fixed roof surface, to make it possible, in this way, for plate 10a to dip under the fixed roof part. Vice versa, when the roof is closed, the interaction of guide bolt 24 of plate 10a with guideway section 44 causes rearmost plate 10a to pivot back into the position in which the plate lies flush with the roof section adjacent in the rear to roof opening 13.

Figure 9:
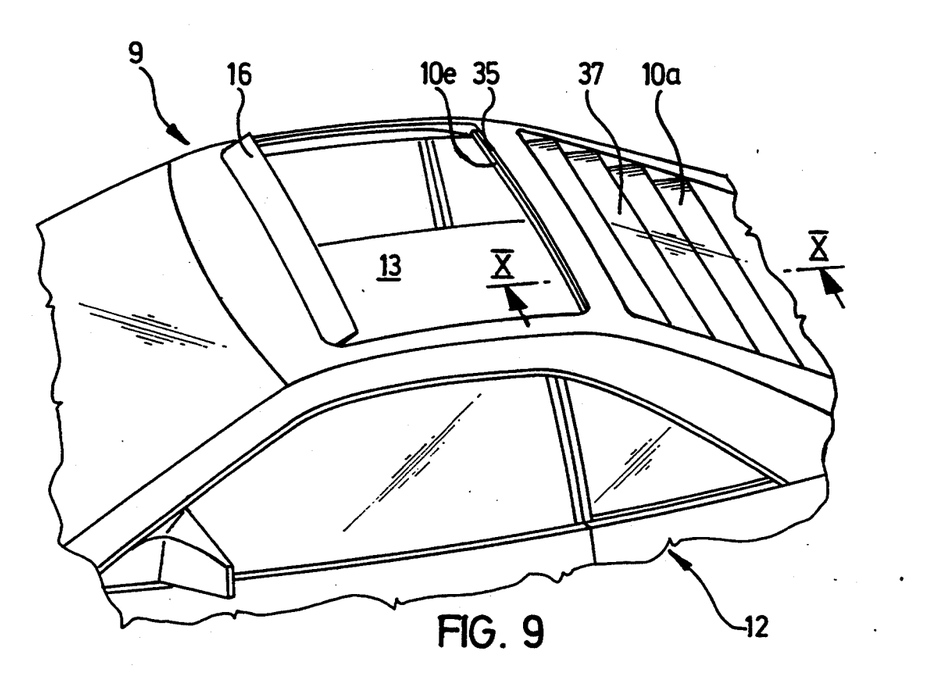
FIG. 9 is a diagrammatic perspective view similar to FIG. 4 of a further modified embodiment of the vehicle roof.

As can be seen especially from FIG. 9, in this embodiment, plates 10a to 10e are arranged like Venetian blinds, mutually separated, one above the other, in front of rear window 37.

Figure 10:
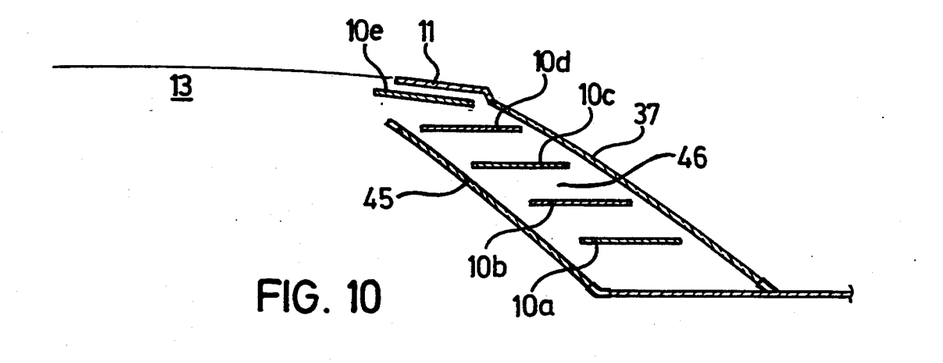
FIG. 10 is a diagrammatic sectional view along line X—X in FIG. 9.
Figures 11, 12:
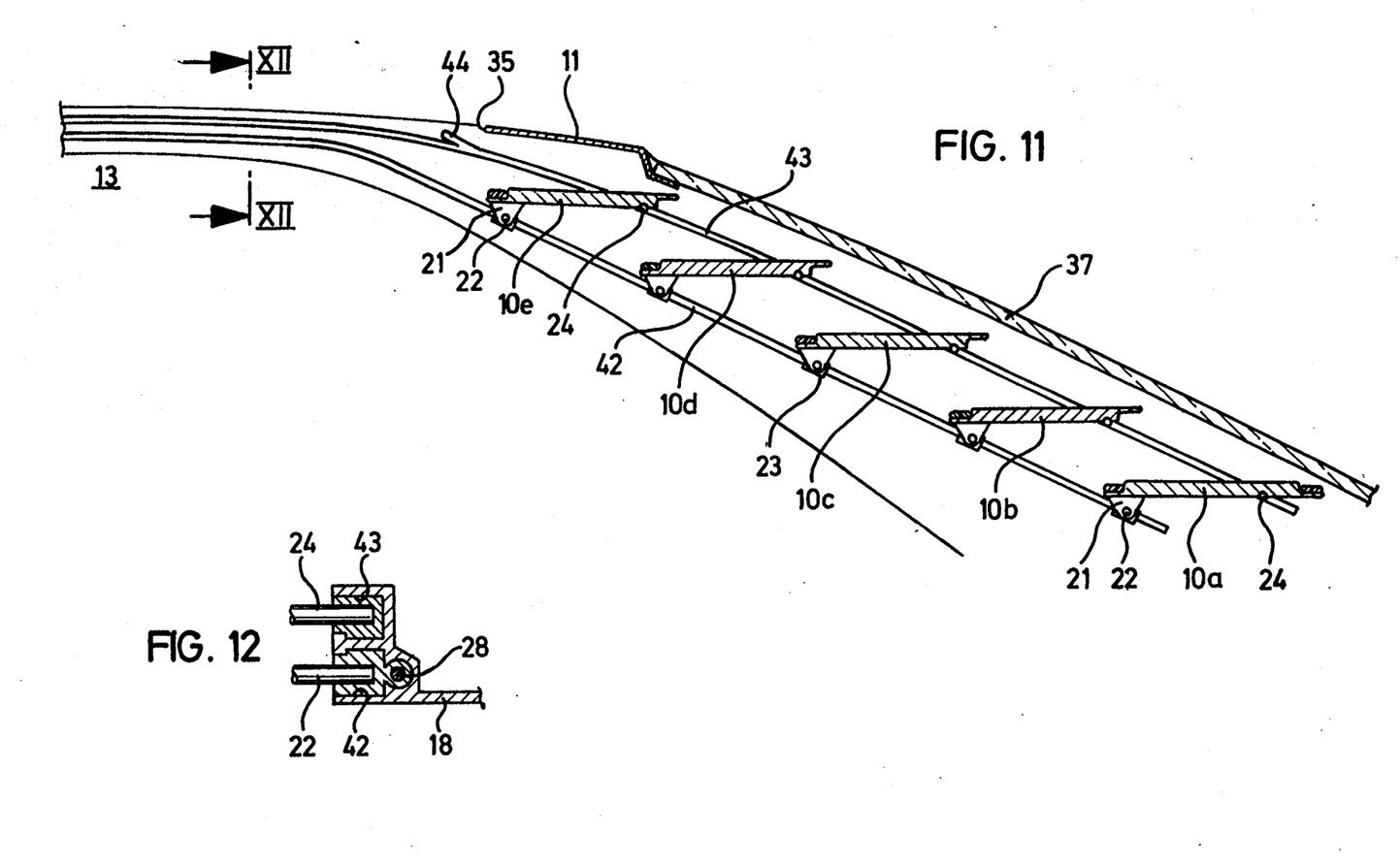
FIG. 11 is an enlarged section, corresponding to FIG. 10, that shows details of the plate guiding devices.
FIG. 12 is a partial section taken along line XII—XII in FIG. 11.

With reference to FIG. 10, a transparent partition 45 can be provided. Partition 45 is located in front of rear window 37, and it defines, together with the rear window, a space 46 within which plates 10a to 10e can be accommodated when the roof is open. Partition 45 prevents reaching into the intermediate spaces between the lowered plates. The transparent partition can be formed, for example, of a glass pane.

While various embodiments in accordance with the present invention have been shown and described, it is understood that the invention is not limited thereto, and is susceptible to numerous changes and modifications as will have become apparent to those skilled in the art from the foregoing. Therefore, this invention should not be viewed as being limited to the details shown and described herein, and instead, includes all such changes and modifications as are encompassed by the scope of the appended claims.

We claim:

1. Vehicle roof with a series of plates for selectively closing and at least partially opening a roof opening in a fixed roof surface, the plates, in a fully closed position, abut one another and form a continuous panel of plates, in which each plate is slidably guided along a path of movement in a guide device that is connected with the fixed roof surface, on each lateral side of the roof opening, on a pair of guide elements which are spaced one forward of the other in a sliding direction, so that, when the plates are displaced along the guide device in an opening direction, the plates of the continuous panel of plates perform a translational movement during which the panel of plates is separated into individual plates in a plate-by-plate manner commencing with a rearmost plate of the plate system, the panel of plates being reestablished in a plate-by-plate manner commencing with a forwardmost plate when the plates are displaced along the guide device in a closing direction; wherein said guide device comprises first and second, separate guideways, the forward one of said guide elements of all of the plates interacting with the first guideway of the guide device and the rear one of said guide elements of all of the plates interacting with the second guideway of the guide device; wherein both guide elements of the plates, on each side of the plates, are permanently interconnected with the respective one of the separate guideways of the guiding device throughout the full range of movement thereof; and wherein the guiding devices extend rearwardly and downwardly with respect to the fixed roof surface as a means for causing each of the plates to dip under the fixed roof surface, at a portion thereof which is adjacent to a rear end of the roof opening when the roof is opened.

2. Vehicle roof according to claim 1, wherein the plates lie in at least approximately parallel planes when the roof is open.

3. Vehicle roof according to claim 2, wherein the rearmost plate is a lowest plate and the foremost plate a topmost plate when the roof is in a fully opened position.

4. Vehicle roof according to claim 3, wherein, when roof is open, the plates are in an offset relationship with respect to each other in which the plates overlap each other in a front-to-back direction and in which the rearmost plate lies farthest to the rear and the foremost plate lies farthest forward.

5. Vehicle roof according to claim 1, further comprising a roof drive and means for automatically coupling and decoupling at least some of the plates with the roof drive as a function of plate position.

6. Vehicle roof according to claim 5, wherein the plates are stacked into a packet of relatively low height when the roof is open.

7. Vehicle roof according to claim 1, further comprising a roof drive; and wherein the plates are permanently connected to the roof drive.

8. Vehicle roof according to claim 7, wherein the plates are arranged in a spaced, substantially horizontal, parallel relationship with respect to each other in front of a rear vehicle window when the roof is open.

9. Vehicle roof according to claim 8, wherein a transparent partition is provided in front of the rear window which, together with the rear window, defines a space within which the plates are located when the roof is open.

10. Vehicle roof according to claim 1, wherein, when roof is in a fully opened position, the plates are in an offset relationship with respect to each other in which the plates overlap each other in a front-to-back direction and in which the rearmost plate lies farthest to the rear and the foremost plate lies farthest forward.

11. Vehicle roof according to claim 1, wherein the forward one of the guide elements of the plates and the respective guideway of the guiding device therefor lie lower than the rear guide elements of the plates and guideway of the respective guiding device therefor.

12. Vehicle roof according to claim 1, wherein a pivoting connection is provided between at least the rearmost plate and its forward guide elements to enable pivoting of the at least rearmost plate around said connection as a means for separating and reestablishing the flat panel of plates.

13. Vehicle roof according to claim 12, wherein the rearmost plate, when the roof is opened, is pivotable about said pivoting connection so as to lower a rear area thereof below the fixed roof surface, after which the rearmost plate is rearwardly slidable along said guideways under the fixed roof surface.

14. Vehicle roof according to claim 13, wherein a said pivoting connection is provided between each of the plates and its forward guide elements; and wherein, after dipping of the rearmost plate below the fixed roof surface, upon further opening of the roof, each successive plate is first displaced rearward into an intermediate position in which it lies at least approximately flush with the rear side of the fixed roof surface, and then is pivoted about its pivoting connection to bring a rear area thereof below the level of the fixed roof surface.

15. Vehicle roof according to claim 14, further comprising a motorized roof drive having a preselect control for placing the plates into each said intermediate position.

16. Vehicle roof according to claim 1, wherein, in an area of a rear edge of the roof opening, a sealing arrangement is provided for sealing a gap between the fixed roof surface and a top side of the plates when the roof is in a fully opened position and in intermediate positions between the fully opened position and the fully closed position.

17. Vehicle roof according to claim 16, wherein the sealing arrangement has an expandable bellows seal.

18. Vehicle roof according to claim 1, wherein the rearmost plate is a lowest plate and the foremost plate a topmost plate when the roof is in a fully opened position.

* * * * *